US012365112B2

(12) United States Patent
Gruber

(10) Patent No.: US 12,365,112 B2
(45) Date of Patent: Jul. 22, 2025

(54) FORMWORK

(71) Applicant: Umdasch Group NewCon GmbH, Amstetten (AT)

(72) Inventor: Roland Gruber, Amstetten (AT)

(73) Assignee: UMDASCH GROUP NEWCON GMBH, Amstetten (AT)

( * ) Notice: Subject to any disclaimer, the term of this patent is extended or adjusted under 35 U.S.C. 154(b) by 517 days.

(21) Appl. No.: 17/756,793

(22) PCT Filed: Dec. 4, 2020

(86) PCT No.: PCT/EP2020/084573
§ 371 (c)(1),
(2) Date: Jun. 2, 2022

(87) PCT Pub. No.: WO2021/110888
PCT Pub. Date: Jun. 10, 2021

(65) Prior Publication Data

US 2023/0009236 A1 Jan. 12, 2023

(30) Foreign Application Priority Data

Dec. 4, 2019 (EP) .................................... 19213624

(51) Int. Cl.
*E04G 11/08* (2006.01)
*B28B 7/00* (2006.01)
*B28B 7/18* (2006.01)

(52) U.S. Cl.
CPC ............ *B28B 7/186* (2013.01); *B28B 7/0017* (2013.01); *B28B 7/0041* (2013.01); *B28B 7/0044* (2013.01); *E04G 11/082* (2013.01)

(58) Field of Classification Search
CPC ......... E04G 15/00; E04G 15/02; E04G 15/06; E04G 15/063; E04G 9/10; E04G 19/003;
(Continued)

(56) References Cited

U.S. PATENT DOCUMENTS 2,557,631 A * 6/1951 Callan ..................... E04G 15/02 249/39
4,055,321 A * 10/1977 Schimmel ................. B28B 7/22 249/185
(Continued)

FOREIGN PATENT DOCUMENTS

CH 632044 A5 9/1982
CN 102667031 A 9/2012
(Continued)

OTHER PUBLICATIONS

China National Intellectual Property Administration, Office Action and Search Report Issued in Application No. 202080081243.6, Feb. 15, 2023, 18 pages. (Submitted with Partial Translation).
(Continued)

*Primary Examiner* — Kyle J. Walraed-Sullivan
(74) *Attorney, Agent, or Firm* — McCoy Russell LLP

(57) ABSTRACT

The disclosure relates to formwork for producing a concrete element, in particular a wall element or ceiling element, having an opening, in particular a window opening or door opening, the formwork comprising: a formwork panel; opening formwork, which has a frame element for delimiting a portion of the opening, a support bracket for supporting the frame element, and a mounting element for mounting the support bracket; a formwork-stripping device for transferring the opening formwork from a formwork position for the formation of the opening into a formwork-stripping position for the release of the concrete element, wherein the formwork-stripping device has a sliding and tilting mechanism for sliding the frame element in a direction parallel to the formwork panel and for tilting the frame element about a pivot axis running substantially parallel to the formwork panel.

14 Claims, 12 Drawing Sheets

(58) Field of Classification Search

CPC ........... E04G 11/08; B28B 7/16; B28B 7/164; B28B 7/18; B28B 7/186; B28B 7/0044; B28B 7/0035; B28B 7/0041

See application file for complete search history.

(56) References Cited

U.S. PATENT DOCUMENTS

| | | | | | |
|---|---|---|---|---|---|
| 4,465,257 | A * | 8/1984 | Schimmel | E04G 11/02 | 249/185 |
| 4,520,988 | A * | 6/1985 | Walker | E04G 11/082 | 249/185 |
| 4,520,989 | A * | 6/1985 | Digh | E04G 11/082 | 249/185 |
| 4,650,150 | A * | 3/1987 | Pacheco-Pifano | E04G 11/082 | 249/19 |
| 4,729,541 | A * | 3/1988 | Maier | E04G 11/065 | 249/185 |
| 5,709,808 | A * | 1/1998 | Lee | E04G 15/02 | 249/157 |
| 2002/0061342 | A1* | 5/2002 | Jensen | B28B 7/0035 | 425/234 |
| 2007/0084984 | A1* | 4/2007 | Pauley | E04G 11/46 | 249/47 |
| 2008/0315458 | A1* | 12/2008 | Ott | B28B 15/005 | 425/62 |
| 2019/0070750 | A1* | 3/2019 | Ott | B28B 7/362 | |

FOREIGN PATENT DOCUMENTS

| | | | | |
|---|---|---|---|---|
| CN | 103774842 | A | 5/2014 | |
| CN | 108412193 | A | 8/2018 | |
| DE | 10219896 | C1 | 8/2003 | |
| DE | 10320003 | A1 * | 11/2004 | E04G 15/02 |
| DE | 102006021892 | A1 | 11/2007 | |
| DE | 102009055690 | A1 | 5/2011 | |
| DE | 102016002435 | A1 * | 9/2017 | B28B 7/0041 |
| RU | 1780352 | A1 | 5/1996 | |
| WO | 2016184947 | A1 | 11/2016 | |
| WO | 2017174432 | A1 | 10/2017 | |

OTHER PUBLICATIONS

ISA European Patent Office, International Search Report Issued in Application No. PCT/EP2020/084573, Feb. 11, 2021, WIPO, 4 pages.

* cited by examiner

FORMWORK

CROSS REFERENCE TO RELATED APPLICATIONS

The present application is a U.S. National Phase of International Application No. PCT/EP2020/084573 entitled “FORMWORK,” and filed on Dec. 4, 2020. International Application No. PCT/EP2020/084573 claims priority to European Patent Application No. 19213624.0 filed on Dec. 4, 2019. The entire contents of each of the above-listed applications are hereby incorporated by reference for all purposes.

TECHNICAL FIELD

The disclosure relates to a formwork for the production of a concrete element, in particular, a wall or ceiling element, with an opening, in particular, a window or door opening, comprising:

- a formwork panel,
- an opening formwork with a frame element for delimiting a portion of the opening, with a support bracket for supporting the frame element and with a mounting element for mounting the support bracket,
- a formwork-stripping device for transferring the opening formwork from a formwork position for the formation of the opening into a formwork-stripping position for releasing the concrete element.

Furthermore, the disclosure relates to a battery mould with such a formwork and another formwork element, wherein a formwork chamber is provided between the formwork panel of the formwork and the other formwork element.

BACKGROUND AND SUMMARY

Ultimately, the disclosure relates to a method for producing a concrete element, in particular, a wall or ceiling element, with an opening, in particular, a window or door opening, comprising the steps:

- providing such a formwork,
- arranging the opening formwork in the formwork position,
- casting of the concrete element with the formwork and separating the concrete element from the formwork.

As is known, for example, from DE 102 198 96 C1, an opening formwork can be used to form an opening for a window, a door or the like in a concrete construction element. The opening formwork is arranged on the formwork shells of an internal and an external formwork. The opening formwork comprises a moveable frame, which is attached to a rigid inner frame. On the outer circumference of the inner frame, guides are formed that hold the frame parts of the opening formwork in an articulately jointed manner. The guides can be pivoted so that the opening formwork is reduced in size and, thereby, the outer formwork can be removed from the produced concrete body together with the opening formwork. Spindles are provided for pivoting the guides, which can be extended or shortened. The disadvantage, however, is that the demoulding of the concrete construction element is complex. The spindles must be adjusted to such an extent that a sufficient distance is created between the frame parts of the opening formwork and the concrete construction element in order to be able to release the formwork from the concrete body. The particular problem is that the frame parts can adhere to the concrete construction element, which can block the stripping of the formwork. Furthermore, it is disadvantageous that the guides and the spindles are exposed to high loads during concreting, which can lead to malfunctions.

On the other hand, the object of the present disclosure is to alleviate or remedy at least individual disadvantages of prior art. The disclosure aims in particular to make the release of the concrete element from the formwork easier and more reliable. Furthermore, a goal of the disclosure can be to improve the removal of loads during concreting.

This task is achieved by means of a formwork, a battery mould and a method.

According to the disclosure, the formwork-stripping device comprises a sliding and tilting mechanism for sliding the frame element in one direction parallel to the formwork panel and for tilting the frame element about a pivot axis substantially parallel to the formwork panel.

To prepare for the release of the concrete element from the formwork, the sliding and tilting mechanism of the formwork-stripping device is actuated. The sliding and tilting mechanism is set up to slide the frame element in the direction parallel to the main plane of the formwork panel and to simultaneously tilt the frame element about the pivot axis running parallel to the main plane of the formwork panel. Thus, the frame element cannot only be slid along the inner side of the formwork panel, but also tilted away from the inner side of the formwork panel. This makes it much easier to separate formwork and construction element after hardening. If the frame element adheres to the concrete element, the concrete element can still be separated from the formwork because the frame element is slid and tilted simultaneously. Thereby, a blockage during demoulding is reliably avoided. If the frame element does not adhere to the concrete element, it can be sufficient to slide the frame element without simultaneously tilting. However, it is essential that the formwork-stripping device is set up to allow both the movement as well as tilting of the frame element.

If the pivot axis of the sliding and tilting mechanism is substantially parallel to the longitudinal axis of the frame element, the frame element can be tilted away from the formwork panel when the concrete element is separated from the formwork. As a result, the concrete element can be reliably deducted from the formwork (or, conversely, the formwork can be removed from the concrete element). In the formwork position, the frame element is preferably arranged substantially perpendicular to the inner side of the formwork panel. If the frame element is tilted during stripping, the frame element is arranged in the formwork-stripping position at an angle to the inner side of the formwork panel.

Preferably, the frame element can be tilted while simultaneously being slid away from the concrete element by at least 2 degrees, in particular, at least 4 degrees, being particularly preferred, at least 6 degrees.

In order to enable the desired slidability and pivotability easily and reliably, the sliding and tilting mechanism of the formwork-stripping device preferably comprises a longitudinal guide, in particular, an oblong hole, and a guide element mounted therein in a slidable and pivotable manner, in particular, a bolt, wherein the longitudinal guide is provided on one of the support bracket and the mounting element and the guide element is provided on the other of the support bracket and mounting element. Preferably, the longitudinal guide is formed on the support bracket and the guide element is formed at the mounting element. However, the reverse arrangement can also be provided. By sliding the guide element along the longitudinal guide while simultaneously pivoting the guide element about the pivot axis, the frame element is shifted inwards and tilted away from the formwork panel. Thus, the desired degrees of freedom of movement are realised in a particularly simple way. The transfer to the formwork-stripping position can be carried out particularly quickly, since a complex actuation of spindles as is the case with prior art is not required. Under the influence of gravity and/or contact with the concrete element, the transition from the formwork to the formwork-stripping position can be jerky. Preferably, all degrees of freedom of the movement of the frame element except the sliding along the formwork panel and the tilting about the pivot axis parallel to the formwork panel are blocked.

In order to release the tilting movement of the support bracket during the transfer to the formwork-stripping position and therefore not to block the tilting movement, the support bracket in accordance with a preferred embodiment variant comprises a rounding to free the pivoting of the support bracket at the end region facing the pivot axis.

In order to ensure the formation of the opening on the concrete element, the opening formwork preferably comprises a securing element for securing the support bracket in the formwork position. In the secured state of the securing element, the opening formwork is secured against transfer from the formwork position to the formwork-stripping position. In the unsecured state of the securing element, the transfer from the formwork position to the formwork-stripping position is released. Thereby, the concrete element can be cast in the secured state of the securing element in the accommodating space of the formwork adjacent to the formwork panel. After the concrete element has hardened, the securing element is moved into the unsecured state in order to be able to transfer the opening formwork from the formwork position to the formwork-stripping position.

For securing and unlocking, the securing element can be connected to the mounting element via a detachable connection, in particular, via a screw connection. By loosening the detachable connection, stripping preparation can be performed. Conversely, the detachable connection is established to allow the pouring of the concrete element with the opening. The detachable connection of the securing element can therefore be reversible, i.e., without loss of function, and preferably be established and detached without tools.

In order to make the assembly particularly simple, reliable and fast, the screw connection comprises a threaded bolt in a preferred embodiment, in particular, substantially in the centre of the mounting element, wherein the securing element comprises a retaining hole for attachment to the threaded bolt. In this embodiment, the screw connection preferably comprises a retaining nut, which fixes the securing element attached to the threaded bolt to the mounting element. Preferably, the threaded bolt is arranged substantially perpendicular to the main plane of the formwork panel, whereby, on the one hand, the attachment of the securing element and, on the other hand, the attachment of the retaining nut is facilitated. It is also advantageous if the securing element comprises a retaining plate on which the retaining hole is formed. This embodiment has, in particular, the advantage that the sliding and tilting mechanism in the secured state of the securing element can be covered at least partially, preferably, substantially covered completely by the retaining plate. This increases the security during operation. The retaining plate in the secured state is preferably arranged substantially perpendicular to the threaded bolt and substantially parallel to the formwork panel. Preferably, the mounting element comprises a mounting plate, which is attached to the formwork panel. In the case of this embodiment, it is advantageous if the retaining plate of the securing element has substantially the same shape and extension as the mounting plate of the mounting element, wherein the retaining plate and the mounting plate in top view, perpendicularly to the formwork panel, are essentially arranged congruently.

Preferably, the mounting element, in particular, a mounting plate of the mounting element, is attached to the formwork panel via a screw connection, for example, using a threaded bolt. However, a magnetic connection can also be provided.

In order to reliably block the sliding or respectively the tilting of the frame element in the formwork position, the securing element comprises in a preferred embodiment a first retaining surface for resting on an outer side of the support bracket facing away from the formwork panel and/or a second retaining surface for resting on a front side of the support bracket facing away from the frame element. Preferably, the second retaining surface of the securing element is formed as a wedge surface. This embodiment ensures a reliable securing of the frame element in the formwork position in order to enable the precise formation of the opening in the concrete element.

In a preferred embodiment, the mounting element comprises at least one first wedge surface and the securing element comprises at least one second wedge surface, wherein, in the secured state of the securing element, the second wedge surface of the securing element rests on the first wedge surface of the mounting element. In the secured state, the first and second wedge surfaces are arranged at an angle to the inner side of the formwork panel, i.e., at an angle different from 90 degrees, for example, at an angle of 70 and 110 degrees respectively. Preferably, the mounting element comprises at least two, in particular four, first wedge surfaces, and the securing element comprises at least two, in particular four, second wedge surfaces. The first and second wedge surfaces preferably diverge in a direction away from the inner side of the formwork panel. The first wedge surfaces preferably delimit a receiving opening, in which a portion of the securing element, in particular, a projection at the underside of a retaining plate of the securing element, is inserted with the second wedge surfaces. The first wedge surfaces form corresponding sloping surfaces for the second wedge surfaces of the securing element in order to facilitate the attachment of the securing element to the mounting element. It is also advantageous that the first and second wedge surfaces cause an effective tensioning of the securing element on the mounting element.

In order to attach a plurality of frame elements to the same mounting element, the mounting element comprises at least two, preferably four, mounting points for mounting two, preferably four, support brackets in a preferred embodiment. Preferably, at least one pair of mounting points is provided for two support brackets, which project away from the mounting element in opposing directions. Thus, two opposing boundaries of the opening of the concrete element can be formed. Depending on the embodiment, however, three support brackets at right angles to each other can also lead away from three mounting points in order to form three boundaries of a rectangular opening of the concrete element. Furthermore, four mounting points can be arranged in pairs at right angles to each other. If support brackets are arranged at all four mounting points, all four boundaries of a rectangular opening can be formed. Thereby, two, three or four support brackets can be arranged at the mounting points of the mounting element, to which a corresponding number of frame elements is attached to form two, three or four boundaries of a rectangular opening of the concrete element.

In a preferred embodiment, the mounting points each comprise at least one retaining flange with a mounting opening. The retaining flange is preferably arranged substantially perpendicular to the formwork panel. Preferably, the guide element, in particular the bolt, of the sliding and tilting mechanism is mounted to the mounting opening. It is also advantageous if the bolt can be detachably attached to the mounting opening, in particular being detachable without tools. The bolt can be secured with a securing cotter pin on the mounting opening. Thus, the associated support bracket can be easily detached from the mounting element if the corresponding mounting point for the current application is not to be occupied with a support bracket.

In accordance with a preferred embodiment, the formwork comprises another formwork panel, wherein the formwork panel and the other formwork panel at their first end regions are pivotably connected to each other so that the formwork panel and the other formwork panel can be transferred from a standing state to a lying state. A "butterfly formwork" with two pivotable formwork elements is known, for example, from the WO 2016/184947 A1. The two preferably rectangular formwork panels are each pivotably connected at a first end region, in particular, on one of their longitudinal sides. For this purpose, an articulated connection can be provided between the first end regions of the formwork panels. As a result, the two formwork panels can be transferred from a standing state in which the formwork elements are preferably aligned substantially vertically, to a lying state in which the formwork elements are preferably substantially aligned horizontally. In the standing state, the first end regions form the upper ends of the formwork elements, and the second end regions form the lower ends of the formwork elements. In the lying state, for example, the opening formwork can be mounted on the formwork panel.

The formwork is preferably used in a battery mould, which comprises another formwork element, wherein a formwork chamber is provided between the formwork panel of the formwork and the other formwork element. The other formwork element can be a single formwork panel. Alternatively, two other formwork elements at their first end regions can be pivotably connected to each other, as explained above in connection with a preferred embodiment of the formwork. In this case, the formwork chamber is formed between the formwork and one of the other formwork elements. Of course, such a battery mould can be extended as desired by formworks and other formwork elements to form a plurality of formwork chambers for the production of several concrete elements. For the production of a concrete element, in particular, a precast concrete element, the formwork can be arranged in the standing state of the formwork panels between two bulkhead partitions of the battery mould. The formwork panels are in the folded (i.e., substantially standing parallel to each other) state.

In the case of the method for producing a concrete element, in particular, a wall or ceiling element, with an opening, in particular, a window or door opening, at least the following steps are carried out, preferably in the order indicated:

- provision of a formwork according to one of the embodiments described above,
- arranging the opening formwork in the formwork position,
- casting of the concrete element with the formwork,
- separating the concrete element from the formwork, wherein, when separating the concrete element, at least one frame element of the opening formwork is slid from the formwork in one direction parallel to the formwork panel and tilted about a pivot axis substantially running parallel to the formwork panel.

For casting the concrete element, another formwork element is preferably arranged opposite to the formwork panel, wherein the opening formwork is located between the formwork panel and the other formwork element. Preferably, the casting of the concrete element is carried out in a battery mould, which comprises the formwork and the other formwork element.

BRIEF DESCRIPTION OF THE FIGURES

The disclosure is further explained below on the basis of a preferred exemplary embodiment, to which, however, it should not be limited.

DETAILED DESCRIPTION

Figure 1:
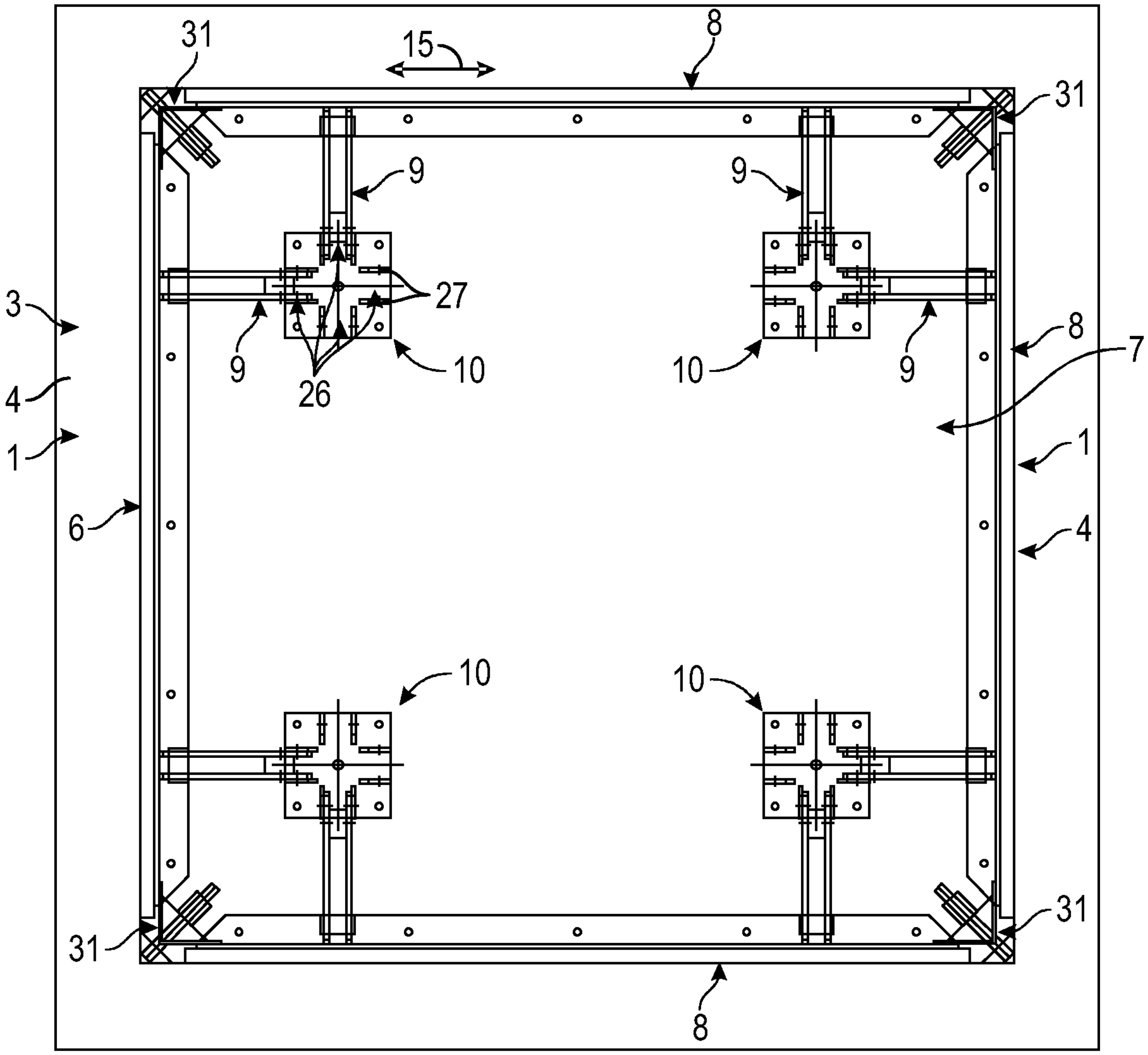
FIG. 1 schematically shows a frontal view of a formwork according to the disclosure with an opening formwork for the production of a concrete element with a window or door opening, wherein the opening formwork comprises four frame elements, which are attached to mounting elements via support brackets.

FIG. 1 shows a formwork device, hereinafter referred to in short as the formwork 1, for the production of a concrete element 2 (shown in FIG. 2), which is, in particular, a rectangular wall or ceiling element. The formwork 1 comprises a formwork panel, i.e., a formwork panel 3, which comprises an inner side 4 to delimit an accommodating space for concrete and an outer side 5 facing away from the accommodating space (cf. FIG. 2). The inner side 4 and the outer side 5 of the formwork panel 3 are substantially flat. On the inner side 4 of the formwork panel 3, an opening formwork 6 is arranged, with which a window or door opening 7 on the concrete element 2 is formed. The opening formwork 6 comprises at least one frame element 8, which delimits a straight portion of opening 7. In the embodiment shown, four frame elements 8 are arranged at right angles to each other to specify a rectangular opening 7. The frame elements 8 are each connected via at least one support bracket 9 with at least one mounting element 10, which is attached to the inner side 4 of the formwork panel 3. In the embodiment in FIG. 1, each frame element 8 is connected to two mounting elements 10 via two support brackets 9.

Figure 2:
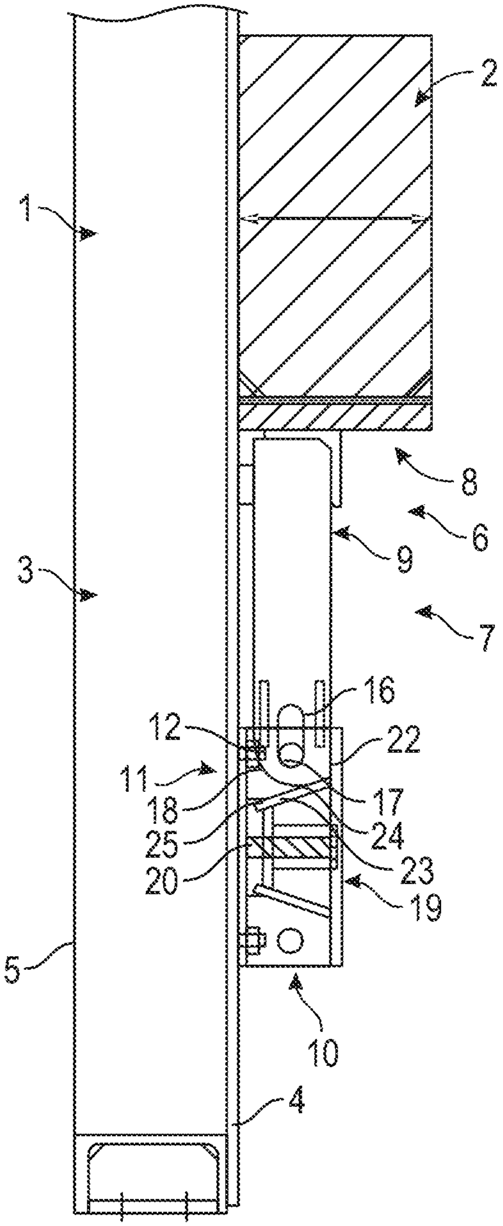
FIG. 2 schematically shows a sectional view of the formwork according to the disclosure, wherein the opening formwork is arranged in a formwork position in which the frame element is still attached to the finished concrete element.
Figure 3:
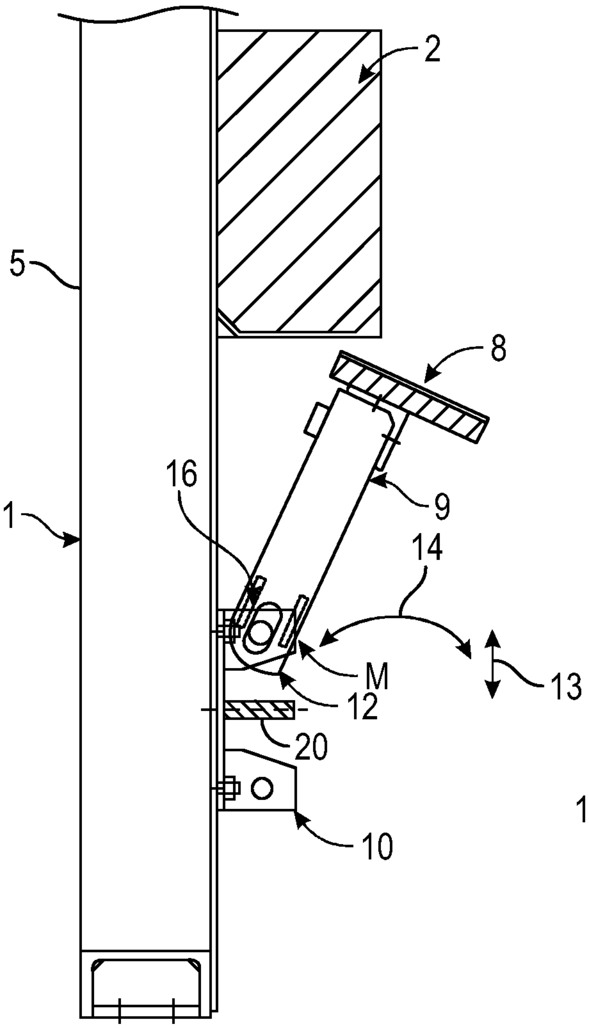
FIG. 3 and FIG. 4 show the formwork in FIG. 2, wherein the frame element is slid away and pivoted away by means of a sliding and tilting mechanism into a formwork-stripping position separated from the concrete element.
Figure 4:
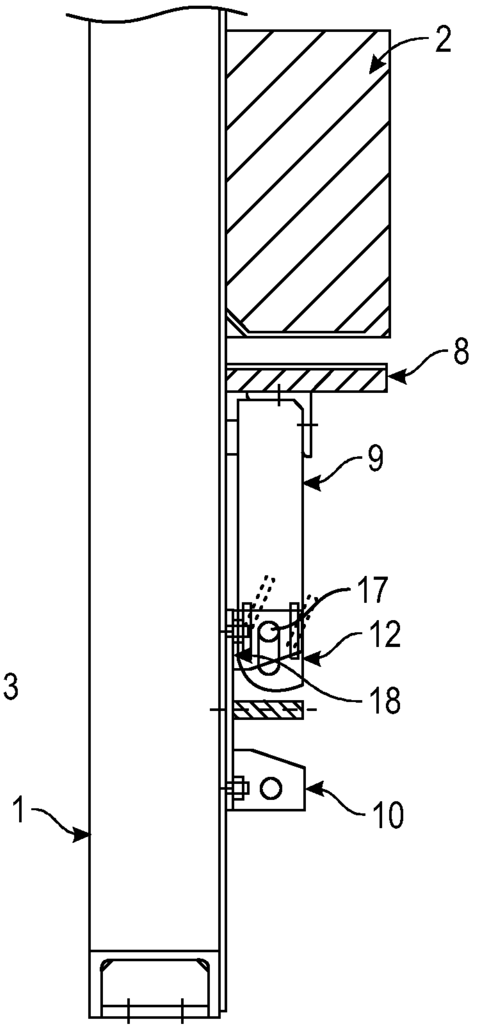

As can be seen from FIG. 2, a formwork-stripping device 11 is provided with which the opening formwork 6 can be moved from a formwork position shown in FIG. 1 and FIG. 2 for concreting the concrete element into a formwork-stripping position shown in FIG. 3, 4 for releasing the concrete element 2 from the formwork 1. The formwork-stripping device 11 comprises a sliding and tilting mechanism 12, which is set up to slide the frame element 8 in a direction 13 parallel to the formwork panel 3 (cf. double arrow 13 in FIG. 3) and to tilt a pivot axis substantially parallel to the formwork panel 3 (cf. double arrow 14 in FIG. 3). In the embodiment shown, the pivot axis of the sliding and tilting mechanism 12 runs parallel to the longitudinal axis 15 of the frame element 8 (cf. FIG. 1).

The sliding and tilting mechanism 12 of the formwork-stripping device 11 comprises a longitudinal guide 16 (here an oblong hole) in which a guide element 17 (here a bolt) can be slid and pivoted. In the embodiment shown, the longitudinal guide 16 is provided on the support bracket 9 and the guide element 17 is provided on the mounting element 10. The support bracket 9 comprises a rounding 18 (i.e., a rounded outer contour) at the end region facing the pivot axis adjacent to the inner side 4 of the formwork panel 3, by means of which the pivoting of the support bracket 9 is released.

Figure 8:
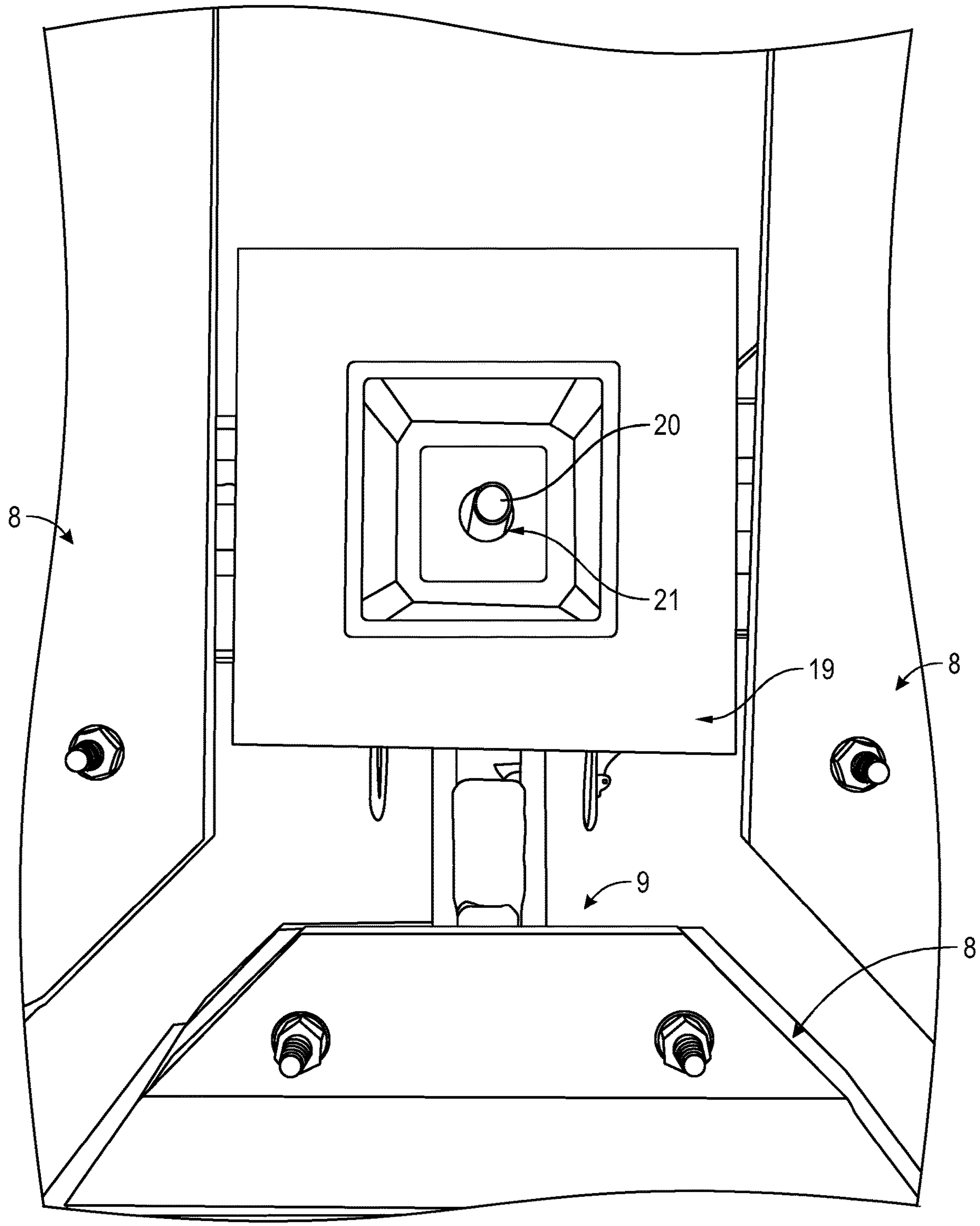
FIG. 8 shows a view of the formwork in which a retaining nut on the securing element was released to prepare for stripping.
Figure 9:
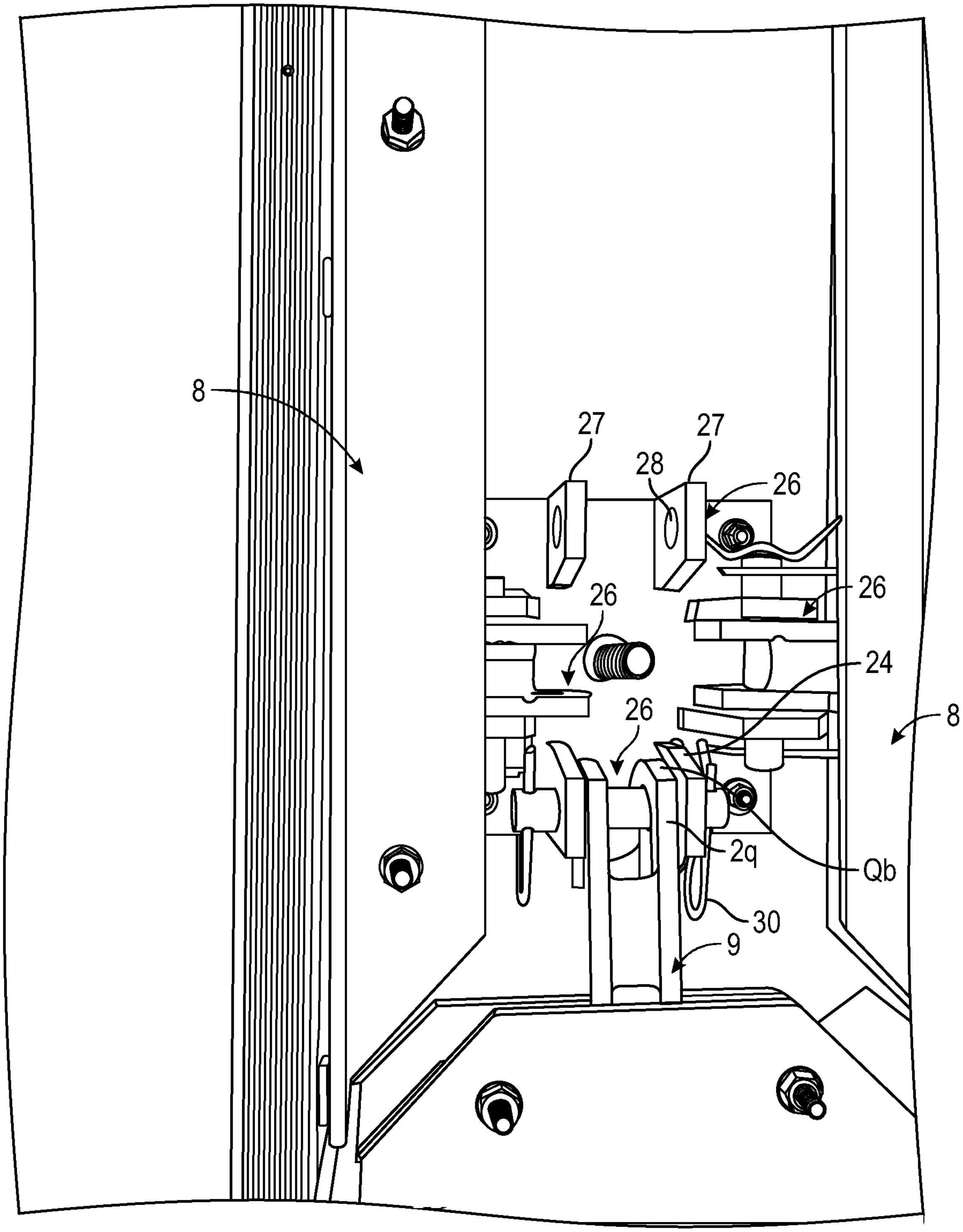
FIG. 9 shows a view of the formwork in which the securing element was removed from the mounting element at the front side of the formwork panel in order to release the sliding and pivoting of the frame elements attached to the mounting element.
Figure 10:
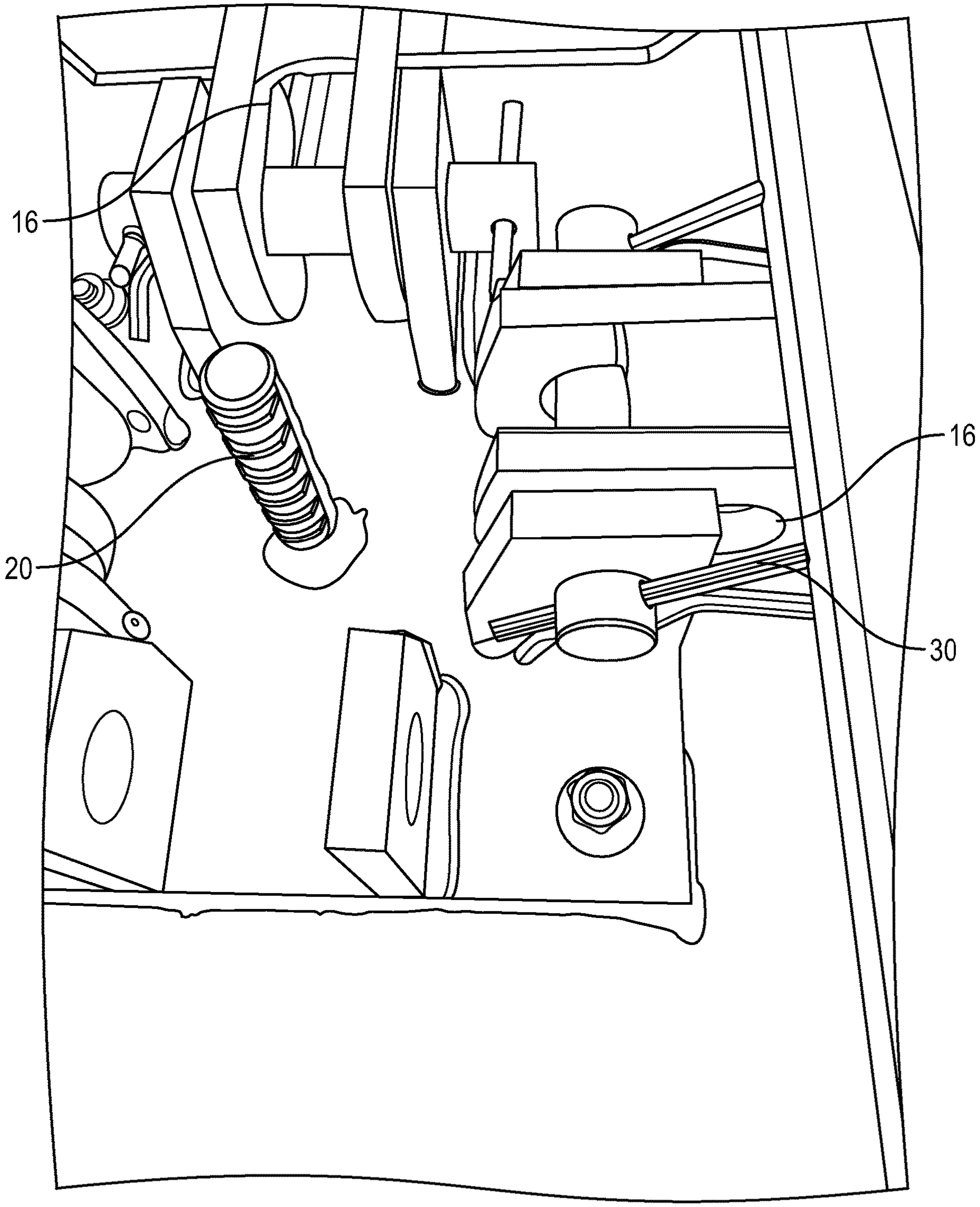
FIG. 10 shows a detailed view of the formwork.
Figure 11:
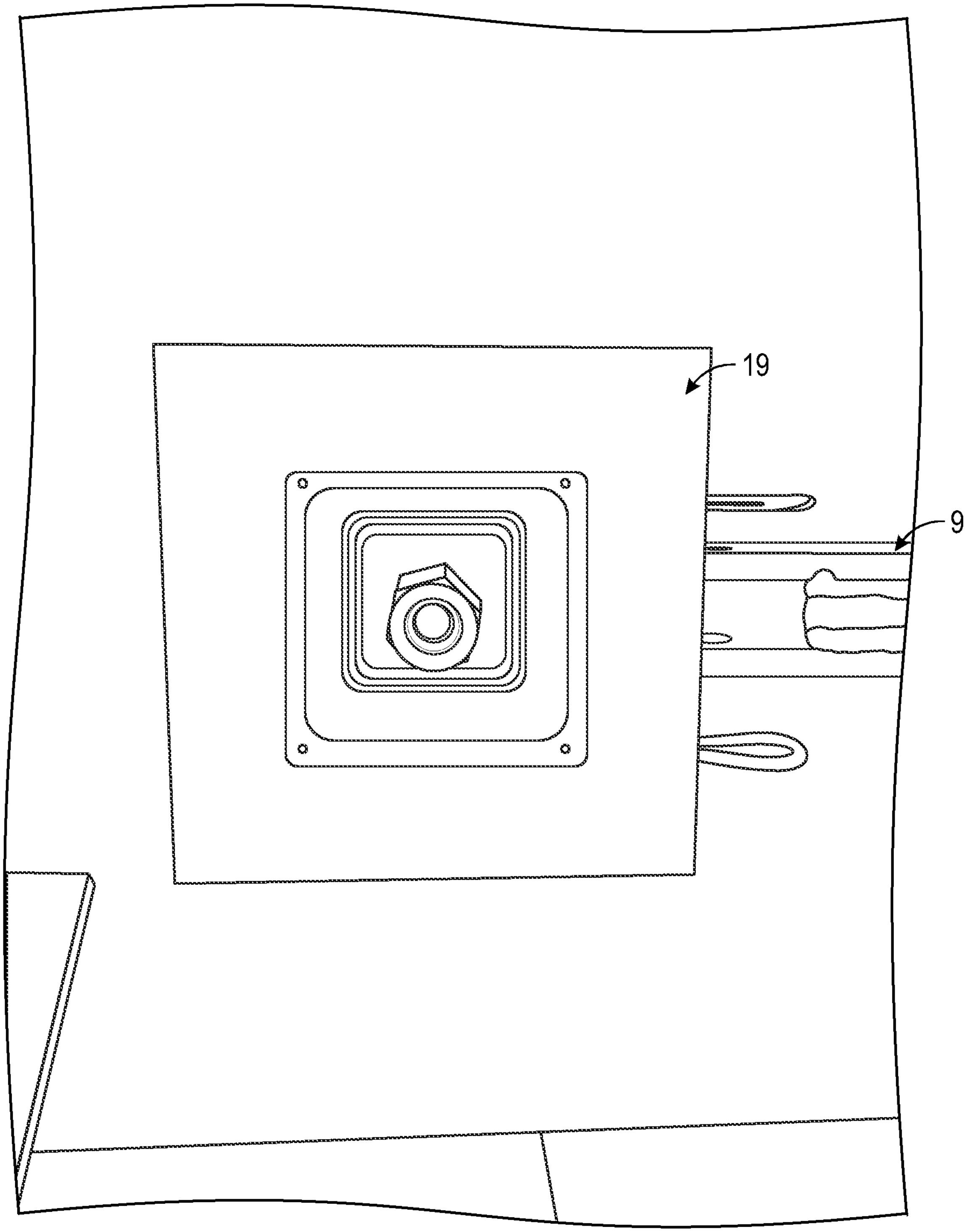
FIG. 11 shows an alternative embodiment variant in which only one frame element is mounted to the mounting element of the opening formwork.
Figure 12:
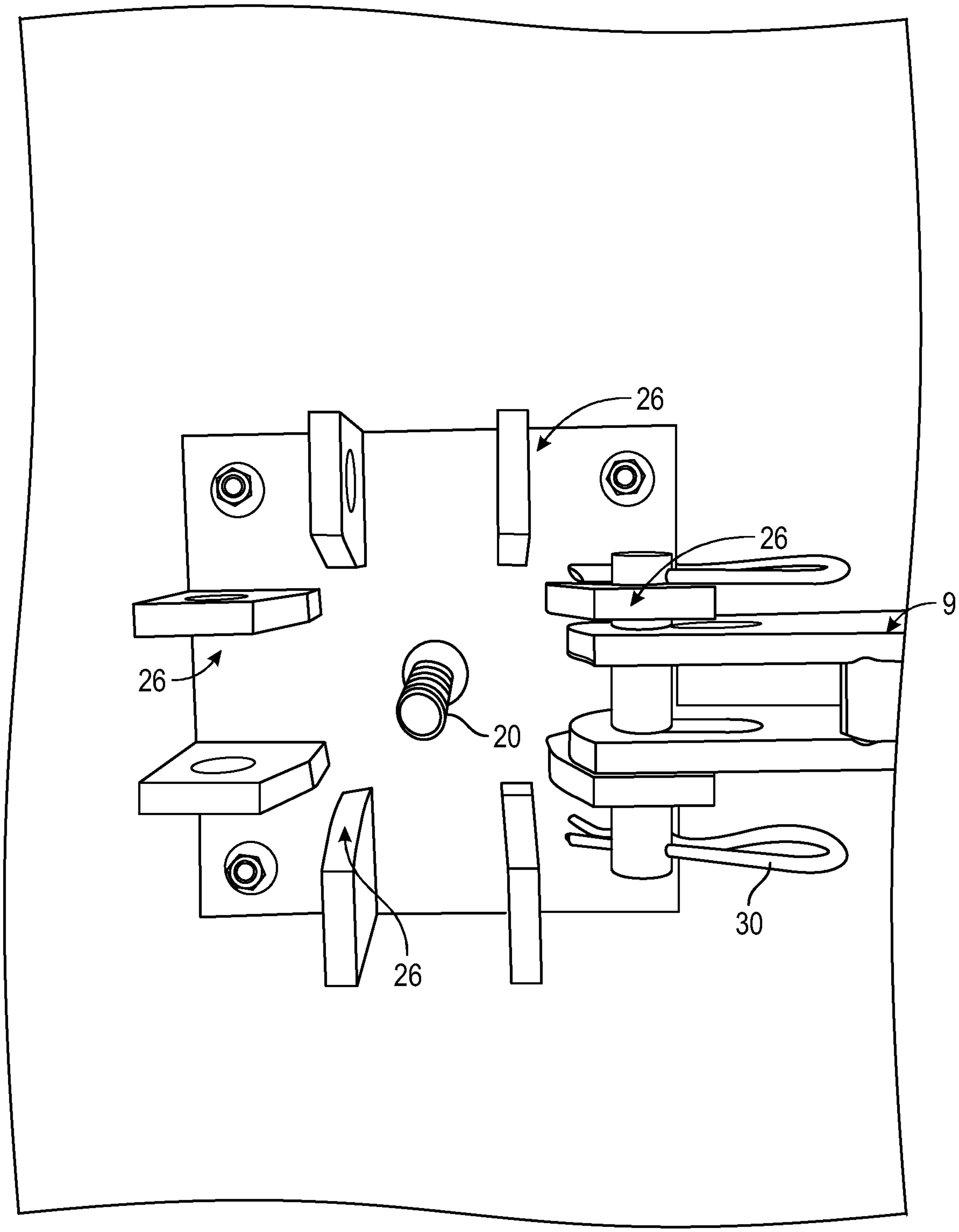
FIG. 12 shows the variant of FIG. 11, but without the securing element.
Figure 13:
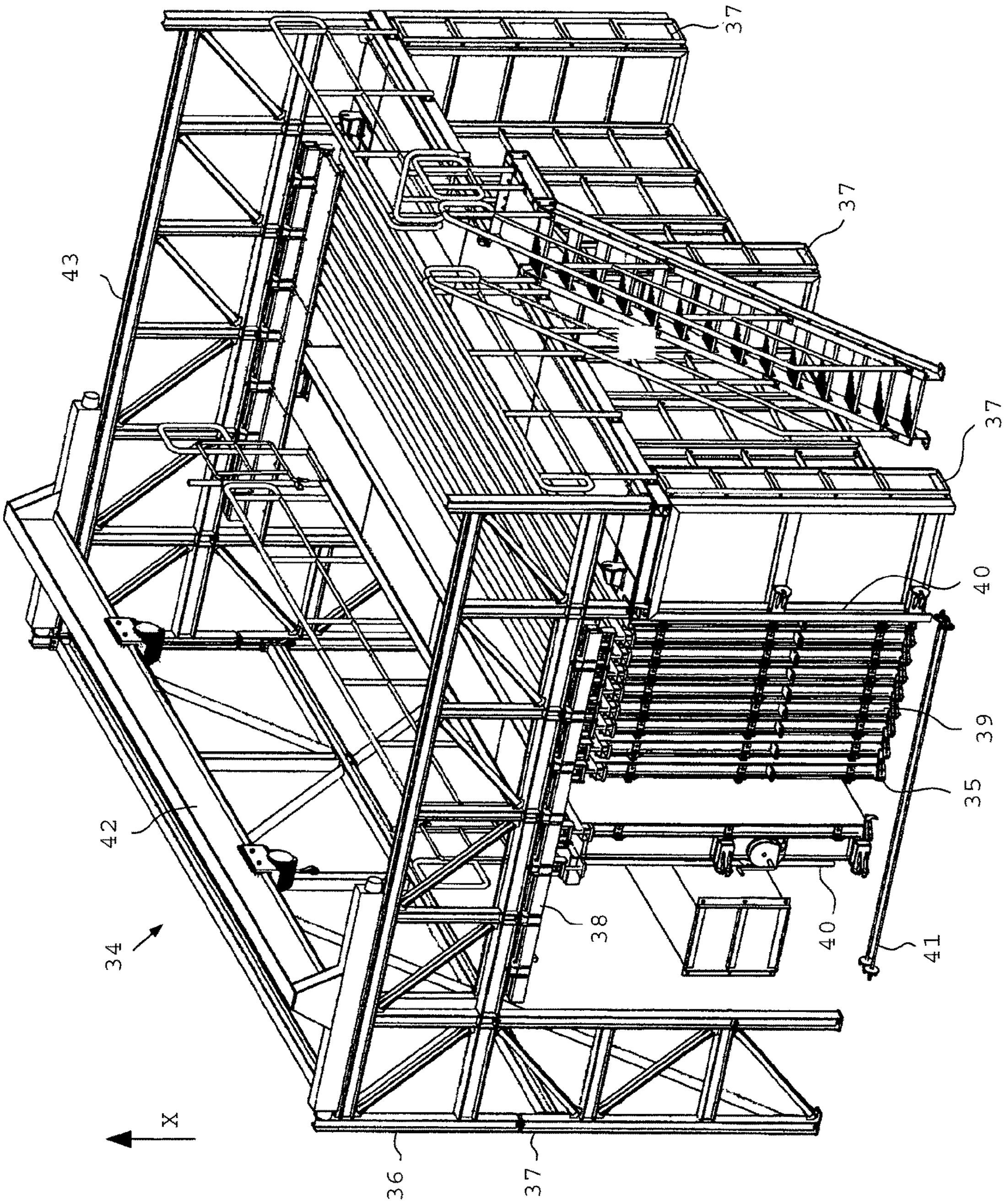
FIG. 13 shows a battery mould in which the formwork according to the disclosure can be used.

As can be seen from FIG. 2, the formwork 1 also comprises a securing element 19 (not shown in FIG. 1) for securing the support bracket 9 in the formwork position. The securing element 19 is connected to the mounting element 10 via a detachable connection, in the embodiment shown via a screw connection. The screw connection comprises a threaded bolt 20, which is fixed in the centre of the mounting element 10. The securing element 19 comprises a retaining hole 21 (cf. FIG. 8) for attaching to the threaded bolt 20. The securing element 19 also comprises a first retaining surface 22 for resting on an outer side 9*a* of the support bracket 9 facing away from the formwork panel and a second retaining surface 23 for resting on a front side 9*b* of the support bracket 9 facing away from the frame element 8. In addition, the mounting element 10 comprises a first wedge surface 24, on which a second wedge surface 25 of the securing element 19 is attached in the secured state.

In the embodiment shown, the mounting element 10 comprises four mounting points 26, at which at least one support bracket 9 and up to four support brackets 9 (including a corresponding number of frame elements 8) are arranged. The mounting points 26 each comprise two retaining flanges 27 with mounting openings 28, to which a bolt 29 for the support bracket 9 can be detachably attached. The bolt 29 can be secured using a securing cotter pin 30.

As can be seen from FIG. 1, the opening formwork also comprise corner formwork parts 31, which are arranged at the corners between two adjacent frame elements 8 of the opening formwork.

Figure 5:
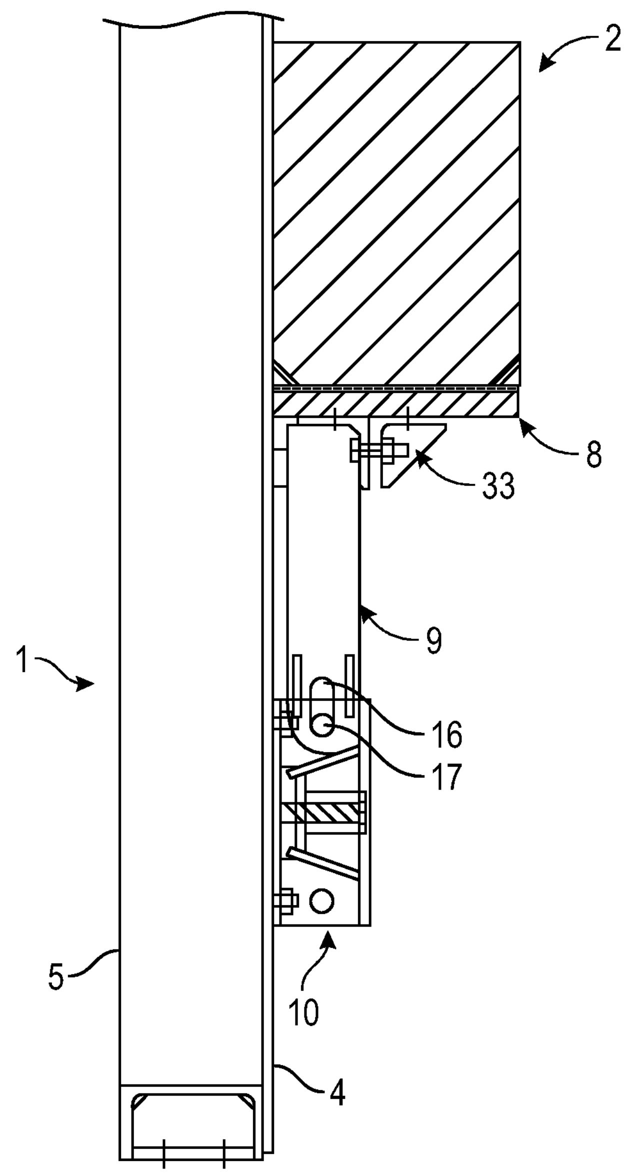
FIG. 5 and FIG. 6 show views corresponding to FIG. 2 and FIG. 4 of a modified embodiment of the formwork, which comprises an attachment bracket between the support bracket and the frame element of the opening formwork for the production of a thicker concrete element.
Figure 6:
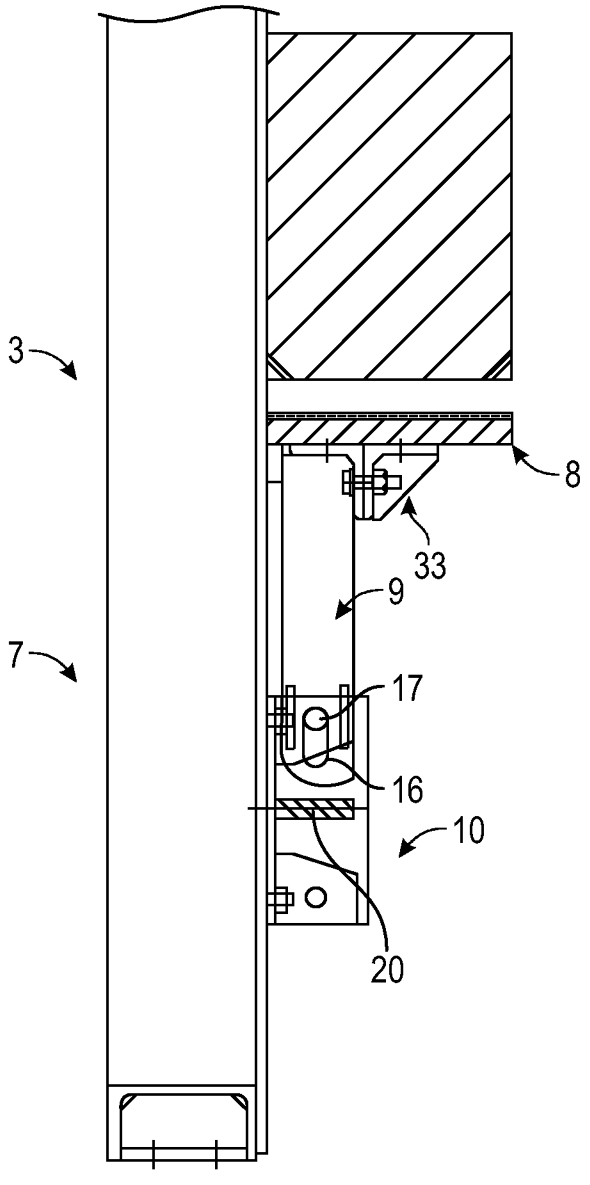

FIG. 5 and FIG. 6 show an embodiment variant in which an additional attachment bracket 33 is provided between the frame element 8 and the support bracket 9.

FIGS. 7 to 10 show the stripping process.

Figure 7:
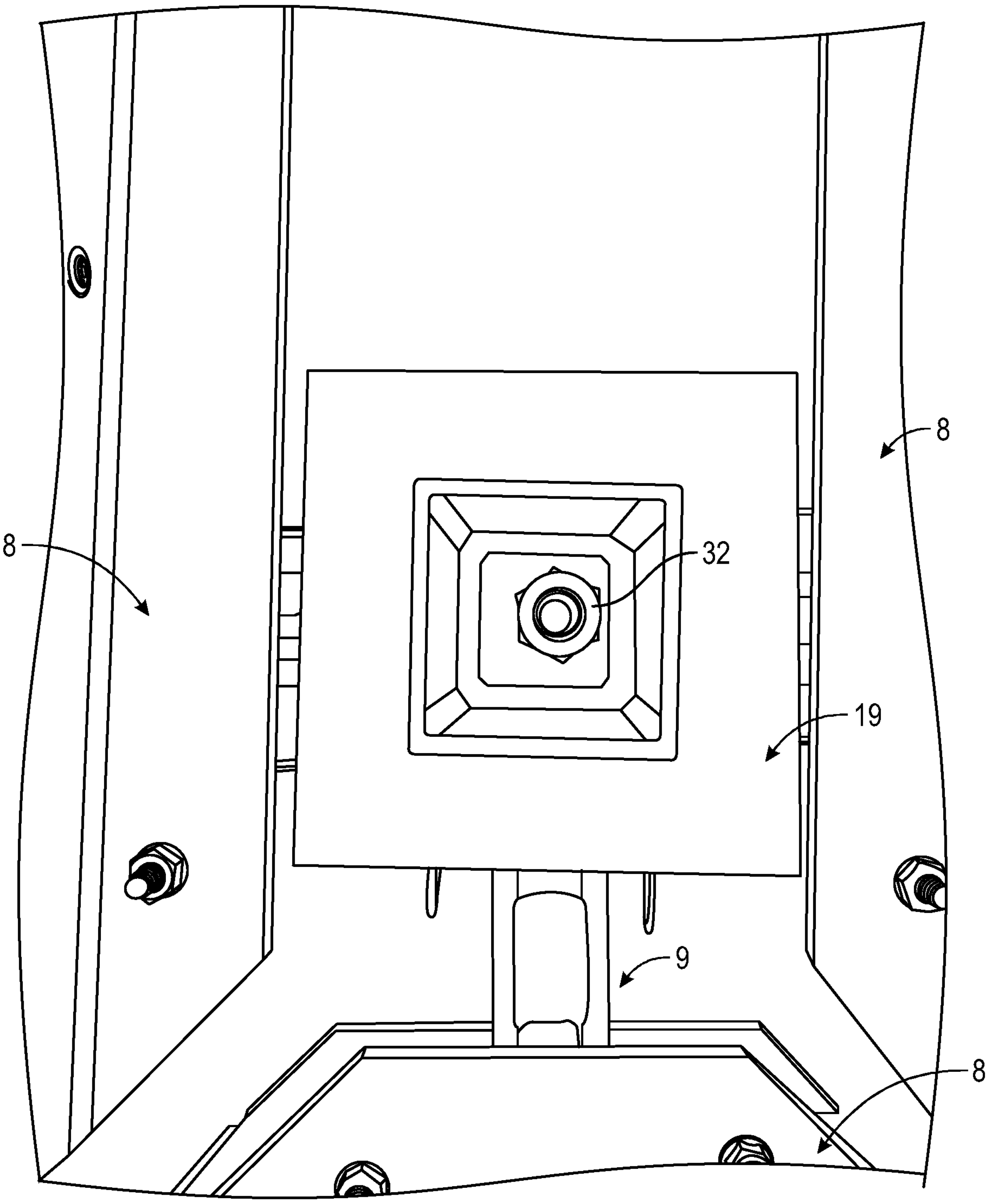
FIG. 7 shows a perspective view of the formwork in the region of the opening formwork, wherein the opening formwork is fixed in the formwork position by means of a securing element.

In the hardened state of the concrete element 2, the corner formwork parts 31 of the opening formwork are first dismantled (cf. FIG. 7). Subsequently, a retaining nut 32 is loosened, which is screwed to the end of the threaded bolt 20 to hold the securing element 19 on the mounting element 10 (cf. FIG. 8). After that, the securing element 19 is removed from the mounting element 10 (cf. FIG. 9). This frees up the slidability and pivotability of the frame elements 8. Thereby, the concrete element 2 can be lifted away from the formwork 1. Already by contact with the concrete element 2, the frame element 8 can be slid and tilted in such a way that the lifting of the concrete element 2 is not blocked.

FIG. 1 shows a schematic representation of, for example, the battery mould 34, known from WO 2017/174432, with formwork devices 35, which comprise the formwork 1 described above.

The battery mould 34 is used for the production of construction elements (not shown in FIG. 1) and, in particular, precast concrete elements for buildings. The battery mould 34 comprises a carrying structure 36 with distanced support sections 37. The number of support sections 37 in FIG. 1 is only to be regarded as an example and can be adapted to the circumstances at hand. Furthermore, the battery mould 34 comprises two support devices 38, in which the bulkhead partitions 39 and the formwork devices 35 are held in a suspended and moveable manner, i.e., in the present embodiment, being slidable. The formwork devices 35 are located between the bulkhead partitions 39. Between at least one bulkhead 39 and a formwork device 35, a cavity to be filled with concrete is formed, wherein preferably the formwork device 35 supports formwork elements (not shown), which determine the contour of the precast concrete element. The formwork elements can, for example, delimit doors or window cut-outs and also seal the cavity filled with concrete during concreting. The formwork elements can, for example, be attached to the formwork device 35 using magnetic holders. In addition, a heating device (not shown) and/or a vibrator (not shown) can also be mounted on the formwork device 35. The formwork device 35 is used between two bulkhead partitions 39 and clamped with them during concreting. The number of support devices 38 of the bulkhead partitions 6 and the formwork devices 2 is to be regarded merely as an example and can be varied depending on the circumstances at hand. For example, formwork devices 35 can be provided for concreting the outer walls, interior walls, floor and roof of a house so that with the battery mould 34 the construction elements for an entire building can be produced simultaneously. The bulkhead partitions 39 and the formwork devices 35 are clamped between two support devices 40. The number of support devices 40 is also to be regarded as merely an example and can be varied according to the requirements at hand. At least one support device 40 is held in the support devices 38 in a moveable manner, i.e., in the present embodiment, being slidable. For stabilisation during concreting, the formwork devices 35 and the support devices 40 can be connected and clamped by one or a plurality of rod-shaped connecting devices 41. The number of connecting devices 41 can be adapted to the conditions at hand. Instead of rod-shaped connecting devices 41, hydraulic connecting devices are also possible. However, the rod-shaped connecting devices 41 are particularly robust and easy to handle. Furthermore, the battery mould 34 comprises a lifting device 42 with which at least one of the formwork devices 35 from the lowered concreting can be transferred to a raised transport position, in which the formwork device 35 can be transferred via a formwork device 35 located in the concreting position in one direction substantially perpendicular to the lifting device. In the case of the battery mould 34, the formwork devices 35 are hung from above into the support devices 38 so that they are distanced from the floor in the suspended state in the concreting position between the support sections 37. The design of the lifting device 42 can be adapted to the requirements. If necessary, a plurality of lifting devices 9 can also be used.

The lifting device 42 is moveable on two distanced guide devices 43, which are designed here as running rails, in a clamping direction of the formwork devices 2. Furthermore, the guide devices 43 are arranged above the support devices 38 and parallel thereto. In order to make the battery moulds 34 more compact, the formwork devices 35 are attached to the support devices 38 at their upper end.

Instead of known formwork devices 35 as shown in WO 2017/174432, the formworks 1 according to the disclosure can be included in the battery mould 34.

The invention claimed is:

1. A formwork for the production of a concrete element with an opening comprising:

a formwork panel, an opening formwork with a frame element to delimit a portion of the opening, with a support bracket for supporting the frame element and with a mounting element for mounting the support bracket, and a formwork-stripping device for transferring the opening formwork from a formwork position to form the opening into a formwork-stripping position for releasing the concrete element, wherein the formwork-stripping device comprises a sliding and tilting mechanism for sliding the frame element in one direction parallel to the formwork panel and for tilting the frame element about a pivot axis extending substantially parallel to the formwork panel, wherein a securing element is provided for securing the support bracket in the formwork position, and wherein the mounting element comprises at least one first wedge surface and the securing element comprises at least one second wedge surface, wherein in a secured state of the securing element the second wedge surface of the securing element rests on the first wedge surface of the mounting element.

2. The formwork according to claim 1, wherein the pivot axis of the sliding and tilting mechanism is substantially parallel to a longitudinal axis of the frame element.

3. The formwork according to claim 1, wherein the sliding and tilting mechanism of the formwork-stripping device comprises a longitudinal guide and a guide element slidably and pivotably mounted therein, wherein the longitudinal guide is provided on one of the support bracket and mounting element and the guide element is provided at the other of the support bracket and mounting element.

4. The formwork according to claim 1, wherein the support bracket at an end region facing the pivot axis comprises a rounding to exempt a pivot of the support bracket.

5. The formwork according to claim 1, wherein the securing element is connected to the mounting element via a detachable connection.

6. The formwork according to claim 5, wherein the detachable connection is detachable via a screw connection.

7. The formwork according to claim 5, wherein the screw connection comprises a threaded bolt, wherein the securing element comprises a retaining hole for attaching to the threaded bolt.

8. The formwork according to claim 1, wherein the securing element comprises a first retaining surface for resting on an outer side of the support bracket facing away from the formwork panel and/or a second retaining surface for resting on a front side of the support bracket facing away from the frame element.

9. The formwork according to claim 1, wherein the mounting element comprises at least two mounting points for the mounting of at least two support brackets.

10. The formwork according to claim 9, wherein the mounting points each comprise at least one retaining flange with a mounting opening.

11. The formwork according to claim 1, wherein the formwork comprises another formwork panel, wherein the formwork panel and the other formwork panel at first end regions of the formwork panel and the other formwork panel are pivotably connected to each other, so that the formwork panel and the other formwork panel can be transferred from a standing state to a lying state.

12. The formwork according to claim 1, wherein the concrete element is a wall or ceiling element, and wherein the opening is a window or door opening.

13. A battery mould comprising:

the formwork for the production of a concrete element with an opening according to claim 1;

another formwork element, wherein a formwork chamber is provided between the formwork panel of the formwork and the other formwork element.

14. A method for the production of a concrete element with an opening, with the steps:

provision of the formwork for the production of a concrete element with an opening according to claim 1 comprising:

arrangement of opening formwork in the formwork position, casting of the concrete element with the formwork, separation of the concrete element from the formwork, wherein at least one frame element of the opening formwork when separating the concrete element from the formwork is slid in one direction parallel to the formwork panel and tilted about a pivot axis extending substantially parallel to the formwork panel.

* * * * *